United States Patent
Dudar

(10) Patent No.: US 10,011,165 B2
(45) Date of Patent: Jul. 3, 2018

(54) GRILL SHUTTER OPERATION

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/367,314

(22) Filed: Dec. 2, 2016

(65) Prior Publication Data

US 2018/0154763 A1    Jun. 7, 2018

(51) Int. Cl.
| | |
|---|---|
| *B60K 11/08* | (2006.01) |
| *B60H 1/00* | (2006.01) |
| *G06K 9/62* | (2006.01) |
| *G05D 3/00* | (2006.01) |
| *H04N 5/232* | (2006.01) |
| *H04N 7/18* | (2006.01) |
| *G06K 9/00* | (2006.01) |

(52) U.S. Cl.
CPC ........ *B60K 11/085* (2013.01); *B60H 1/00657* (2013.01); *B60H 1/00742* (2013.01); *B60H 1/00878* (2013.01); *G05D 3/00* (2013.01); *G06K 9/00791* (2013.01); *G06K 9/6202* (2013.01); *H04N 5/23206* (2013.01); *H04N 7/183* (2013.01)

(58) Field of Classification Search
CPC .. B60K 11/085; G06K 9/00791; H04N 7/183; H04N 5/23206; B60H 1/00878; B60H 1/00742; B60H 1/00657
See application file for complete search history.

(56) References Cited

U.S. PATENT DOCUMENTS

| | | | |
|---|---|---|---|
| 6,128,559 A | 10/2000 | Saitou et al. | |
| 2013/0338870 A1* | 12/2013 | Farmer | B60K 11/085 701/29.2 |
| 2014/0005897 A1* | 1/2014 | Hayakawa | B60K 11/085 701/49 |
| 2014/0150756 A1* | 6/2014 | Smith | F02M 31/205 123/563 |
| 2015/0191078 A1 | 7/2015 | Miyaji et al. | |
| 2015/0197148 A1* | 7/2015 | Kobayashi | B60K 11/085 701/49 |
| 2015/0343892 A1 | 12/2015 | Kolhouse et al. | |
| 2015/0348335 A1* | 12/2015 | Ramanujam | G07C 5/006 701/23 |
| 2016/0108837 A1 | 4/2016 | Sugimoto | |

FOREIGN PATENT DOCUMENTS

| | | |
|---|---|---|
| EP | 2687394 A1 | 2/2014 |
| FR | 3020021 A1 | 10/2015 |
| WO | 20141841159 A1 | 11/2014 |

OTHER PUBLICATIONS

Search Report from United Kingdom Intellectual Property Office dated May 16, 2018 regarding GB Application No. 1719741.9 (3 pages).

* cited by examiner

*Primary Examiner* — Michael J Zanelli
(74) *Attorney, Agent, or Firm* — Frank A. MacKenzie; Bejin Bieneman PLC

(57) ABSTRACT

A first vehicle instructs a second vehicle to move a grill shutter to a specified position. An image of the grill shutter is captured. Whether the grill shutter is in the specified position is determined based at least in part on the image. The second vehicle is messaged indicating a malfunction when the grill shutter is not in the specified position.

18 Claims, 4 Drawing Sheets

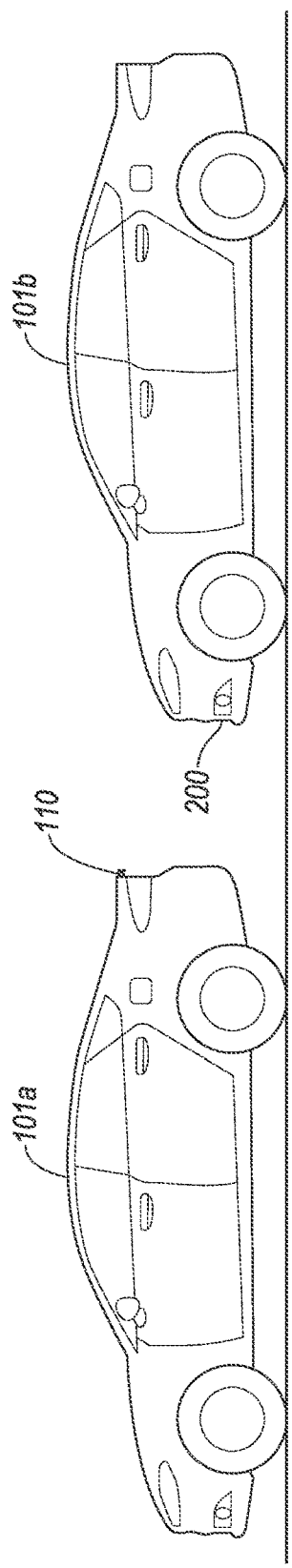
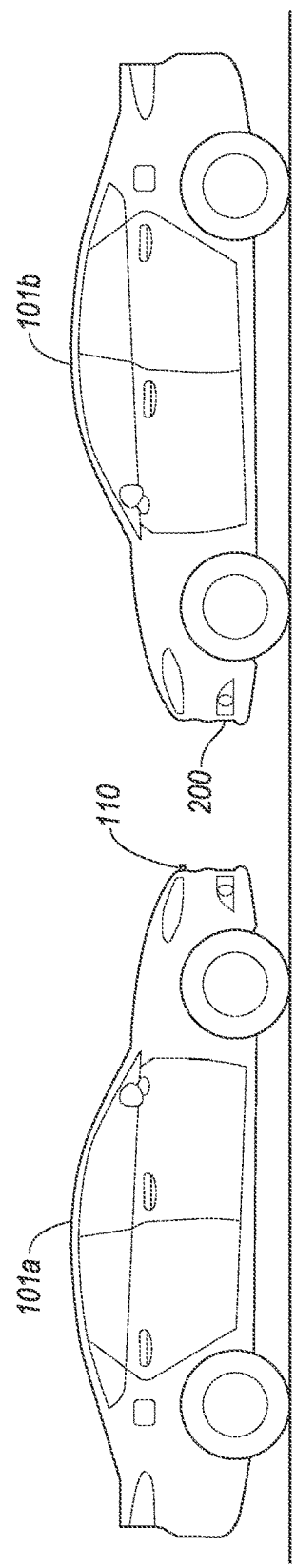
FIG. 2A
FIG. 2B

GRILL SHUTTER OPERATION

BACKGROUND

Vehicles typically introduce ambient air into an engine compartment for various vehicle systems, e.g., cooling, exhaust, etc. The amount of air introduced can be controlled by opening and closing an active grill shutter. Opening the active grill shutter can be important for cooling vehicle components, but may not be needed in certain conditions. Closing the active grill shutter allows the air to pass over the shutter and aerodynamic drag on the vehicle can be reduced. Systems are lacking for detecting whether the active grill shutter is correctly open or closed.

BRIEF DESCRIPTION OF THE DRAWINGS

FIG. 2A is a view of a first vehicle capturing an image of the active grill shutter of a second vehicle with a rearview camera.

FIG. 2B is a view of the first vehicle capturing the image of the active grill shutter of the second vehicle with a front camera.

DETAILED DESCRIPTION

A computing device in a host vehicle can instruct a computing device in a target vehicle to actuate an active grill shutter to a specified position. The computing device in the host vehicle can actuate a camera to capture an infrared image of the active grill shutter. Alternatively or additionally, the camera can capture an optical image of the active grill shutter. The computing device of the host vehicle can determine, based on the image, whether the active grill shutter is in the specified position. When the active grill shutter is not in the specified position, the computing device of the host vehicle can send a notification to the computing device of the target vehicle. If the specified position is an open position and the active grill shutter is not in the specified position, the computing device of the host vehicle can instruct a climate control subsystem in the target vehicle to actuate a heater upon determining that the target vehicle has no occupants.

Figure 1:
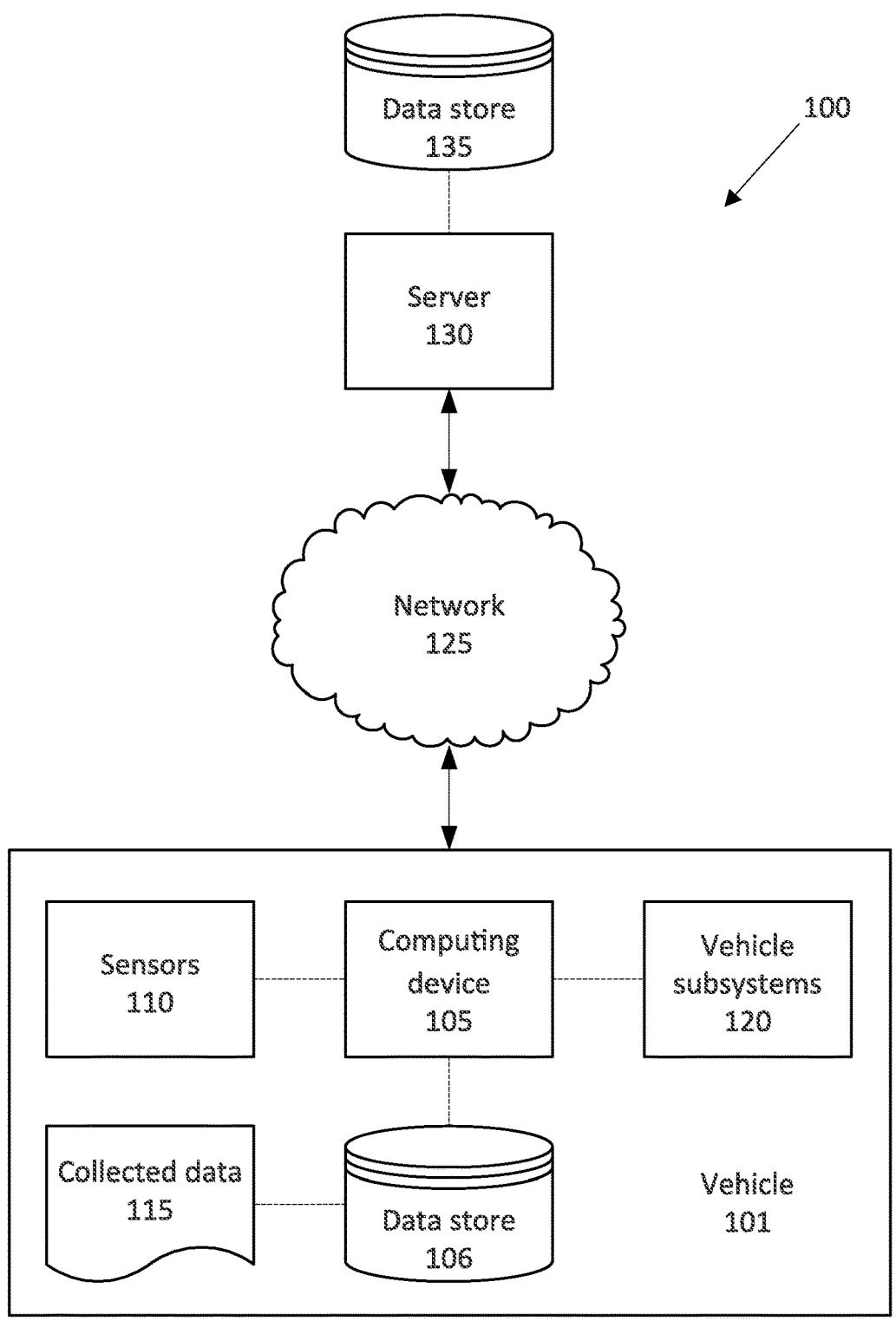
FIG. 1 is a block diagram of an example system for operating an active grill shutter.

FIG. 1 illustrates a system 100 for operating an active grill shutter on a vehicle 101. A computing device 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computing device 105 is generally programmed for communications on a vehicle 101 network, e.g., including a communications bus, as is known. Via the network, bus, and/or other wired or wireless mechanisms (e.g., a wired or wireless local area network in the vehicle 101), the computing device 105 may transmit messages to various devices in a vehicle 101 and/or receive messages from the various devices, e.g., controllers, actuators, sensors, etc., including sensors 110. Alternatively or additionally, in cases where the computing device 105 actually comprises multiple devices, the vehicle network may be used for communications between devices represented as the computing device 105 in this disclosure. In addition, the computing device 105 may be programmed for communicating with the network 125, which, as described below, may include various wired and/or wireless networking technologies, e.g., cellular, Bluetooth, wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a parking maneuver, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computing device 105, and/or at the server 130. In general, collected data 115 may include any data that may be gathered by the sensors 110 and/or computed from such data.

The vehicle 101 may include a plurality of subsystems 120. Each subsystem 120 includes one or more vehicle 101 components that together operate to perform a vehicle 101 function. For example, the subsystems 120 can include, e.g., a propulsion (including, e.g., an internal combustion engine and/or an electric motor, etc.), a transmission, a steering subsystem, a brake subsystem, a park assist subsystem, an adaptive cruise control subsystem, an adaptive steering subsystem, etc.

The computing device 105 may actuate the subsystems 120 to control the vehicle 101 components, e.g., to stop the vehicle 101, to avoid targets, etc. The computing device 105 may be programmed to operate some or all of the subsystems 120 with limited or no input from a human operator, i.e., the computing device 105 may be programmed to operate the subsystems 120. When the computing device 105 operates the subsystems 120, the computing device 105 can ignore input from the human operator with respect to subsystems 120 selected for control by the computing device 105, which provides instructions, e.g., via a vehicle 101 communications bus and/or to electronic control units (ECUs) as are known, to actuate vehicle 101 components, e.g., to apply brakes, change a steering wheel angle, etc. For example, if the human operator attempts to turn a steering wheel during steering operation, the computing device 105 may ignore the movement of the steering wheel and steer the vehicle 101 according to its programming.

When the computing device 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computing device 105.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, vehicle-to-vehicle (V2V) such as Dedicated Short Range Communications (DSRC), etc.), local area networks (LAN) and/or wide area networks (WAN), including the Internet, providing data communication services.

FIGS. 2A-2B illustrate vehicles 101 performing a diagnostic on an active grill shutter 200. In the example of FIG. 2A, a host vehicle 101a, i.e., a first vehicle 101a, is in front of a target vehicle 101b, i.e., a second vehicle 101b. The host vehicle 101a has a rearview camera 110 that can capture an image of an active grill shutter 200 of the target vehicle 101b. The camera 110 can capture an infrared image of the active grill shutter 200. Alternatively or additionally, the camera 110 can capture an optical image of the active grill shutter 200, i.e., an image captured with visible light. Furthermore, as shown in the example of FIG. 2B, the host vehicle 101a can have a front camera 110 that captures the image of the active grill shutter 200. The host vehicle 101a can use the front camera 110 when at least one of the host vehicle 101a and the target vehicle 101b is stationary, e.g., in a parking lot, a garage, etc.

Each vehicle 101 can include an active grill shutter 200. The active grill shutter 200 is positioned at a front end of the vehicle 101. The active grill shutter 200 introduces air to a cooling subsystem 120 that can control propulsion coolant temperatures, a climate control, exhaust emissions, etc. The active grill shutter 200 moves from an open position to a closed position. In the open position, ambient air is introduced to the vehicle 101. In the closed position, air is prevented from entering the vehicle 101 through the grill shutter 200. Typically, the active grill shutter 200 is in the closed position when starting the propulsion, allowing the propulsion (e.g., an internal combustion engine) to reach an efficient operating temperature without the additional cooling effect of ambient air. Furthermore, the active grill shutter 200 reduces drag on the vehicle 101 in the closed position. That is, when the propulsion does not require additional cooling, the computing device 105 moves the active grill shutter 200 to the closed position to reduce aerodynamic drag, decreasing fuel consumption.

The host vehicle 101a can perform a diagnostic of the active grill shutter 200 of the target vehicle 101b. The computing device 105a of the host vehicle 101a can instruct the computing device 105b of the target vehicle 101b to move the panels 210 of the grill shutter 200 to a specified position, e.g., a fully open position, a fully closed position, etc. The camera 110 of the host vehicle 101a can capture an image of the active grill shutter of the target vehicle 101b in the specified position. Based on the image, the computing device 105a of the host vehicle 101a can determine whether the grill shutter is in the specified position. For example, if the image is a thermal infrared image, the computing device 105a can compare a temperature from the grill shutter 200 to an ambient air temperature. Based on the difference between the temperature of the grill shutter 200 and the ambient air temperature, the computing device 105a can determine whether the grill shutter is in the specified position.

Upon determining that the active grill shutter 200 is malfunctioning, the computing device 105b of the target vehicle 101b can perform countermeasures to mitigate the active grill shutter 200. For example, the computing device 105b can identify a repair location and actuate subsystems 120b to move the target vehicle 101b to the repair location. In another example, the computing device 105b can reduce output by a propulsion subsystem 120b to reduce heat generated and aerodynamic drag on the vehicle 101b.

Figure 3A:
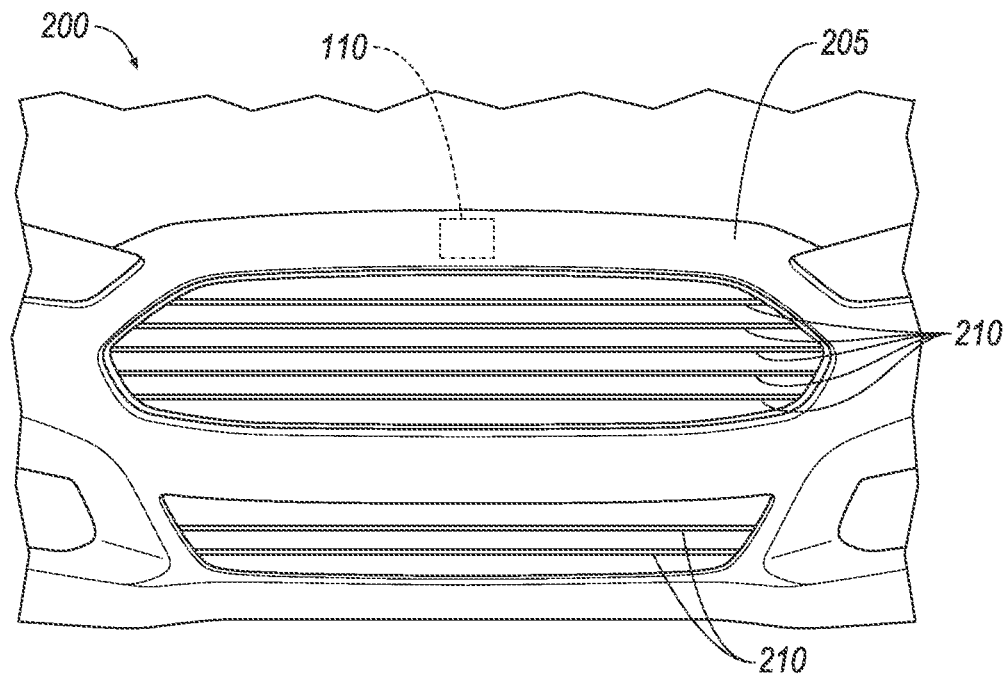
FIG. 3A is an example view of the active grill shutter in an open position.
Figure 3B:
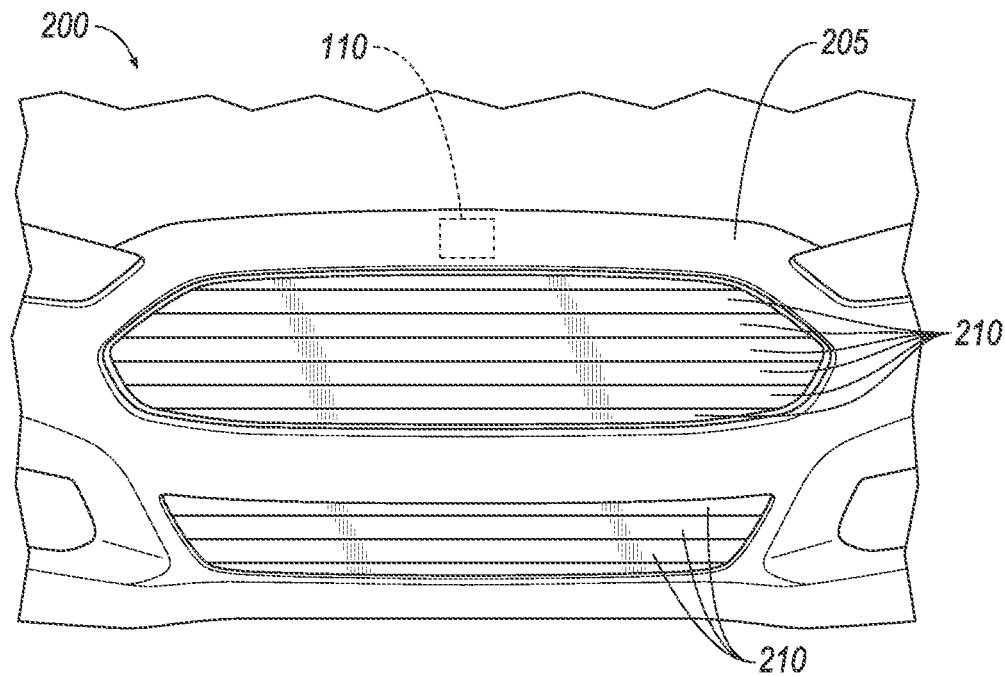
FIG. 3B is an example view of the active grill shutter in a closed position.

The active grill shutter 200 can include a grill shutter sensor 110, as shown in FIGS. 3A and 3B. The grill shutter sensor 110 may be, e.g., a Hall effect sensor. The grill shutter sensor 110 determines the position of the panels 210 and transmits the position to the computing device 105. However, the grill shutter sensor 110 may malfunction, identifying a position of the panels 210 when the panels 210 are stuck and/or in a different position. The computing device 105b of the target vehicle 101b can send a notification to the computing device 105a of the host vehicle 101a indicating the reading from the grill shutter sensor 110. That is, the computing device 105a can instruct the grill shutter sensor 110 to determine whether the grill shutter 200 is in the specified position and send another notification to the computing device 105b indicating a malfunction of the grill shutter sensor 110 when the determination by the grill shutter sensor 110 differs from the determination based on the image.

FIG. 3A illustrates an example active grill shutter 200 of the vehicle 101 in an open position. The grill shutter 200 includes a frame 205. The frame 205 is attached to the vehicle 101 body. The frame 205 rotatably supports a plurality of panels 210. The panels 210 are rotatable from the open position to the closed position. The computing device 105 can actuate a motor (not shown) to rotate the panels 210.

When the panels are in the open position, as shown in FIG. 3A, air from outside the vehicle 101 is drawn into the vehicle 101 for use in, e.g., a propulsion cooling subsystem 120, a climate control subsystem 120, etc. Thus, when a propulsion temperature exceeds a predetermined threshold, the computing device 105 can rotate the panels 210 to the open position to draw cooler ambient air into the vehicle 101.

FIG. 3B illustrates an example active grill shutter 200 of the vehicle 101 in a closed position. When the panels 210 are in the closed position, air is prevented from being drawn into the vehicle 101. When air is drawn into the vehicle 101, the air pushes against the interior of the vehicle 101, increasing drag on the vehicle 101 and increasing fuel consumption. Thus, when the panels 210 are in the closed position, the air passes over the vehicle 101, reducing aerodynamic drag and increasing fuel efficiency of the vehicle 101. When the subsystems 120 do not require additional cooling, the computing device 105 can move the active grill shutter 200 to the closed position to reduce the aerodynamic drag. Furthermore, when the vehicle 101 is starting an internal combustion engine, the active grill shutter 200 can remain in the closed position to increase the temperature in the vehicle 101 until the engine requires additional cooling.

The computing device 105 can determine whether the active grill shutter 200 is in the specified position by capturing an infrared image of the active grill shutter 200. The computing device 105 can use the infrared image of the active grill shutter 200 to determine a temperature difference between an ambient air temperature and a temperature of the active grill shutter 200. For example, when the active grill shutter 200 is in the open position, the infrared image of the active grill shutter 200 should indicate that the temperature of the active grill shutter 200 is higher than the ambient air temperature by at least a predetermined threshold. The computing device 105 can determine the ambient air temperature with a temperature sensor 110, as is known. The computing device 105 can instruct the active grill shutter 200 to move to the open position and capture an infrared image of the active grill shutter 200 with the camera 110. When the computing device 105 determines that the temperature of the active grill shutter 200 is not higher than the ambient air temperature by at least the predetermined threshold, the computing device 105 can determine that the active grill shutter 200 is not in the open position.

In another example, the computing device 105 can instruct the active grill shutter 200 to move to the closed position. In the closed position, the infrared image of the active grill shutter 200 should be within a predetermined threshold of the ambient air temperature. When the computing device 105 determines that the temperature of the active grill shutter 200 is higher than the ambient air temperature by at least the predetermined threshold, the computing device 105 can determine that the active grill shutter 200 is not in the closed position.

The computing device 105 can determine whether the active grill shutter 200 is in the specified position by capturing an optical image of the active grill shutter 200 and comparing the optical image to a stored image of the active grill shutter 200. The computing device 105 can use known image subtraction techniques to determine a difference between the optical image to the stored image. That is, the computing device 105 subtracts the optical image from the stored image, producing a difference image that shows portions of one of the images that are not present in the other of the images. For example, if the computing device 105 subtracts an optical image of the grill shutter 200 in the open position from a stored image of another grill shutter in the closed position, the difference image would show the panels 210 that are in the closed position. The computing device 105 can analyze the difference image to determine whether the grill shutter 200 is in the specified position. For example, if the amount of pixels in the difference image is above a predetermined threshold, the computing device 105 can determine that the panels 210 are not in the specified position, and the active grill shutter 200 is malfunctioning. Alternatively, the computing device 105 can analyze a specified portion of the difference image corresponding to the portions of the optical image and the stored image displaying the panels 210. If the specified portion is blank, i.e., the image subtraction techniques removed the pixels from the specified portion, then the computing device 105 can determine that the panels 210 were moved to the specified position and the active grill shutter 200 is functional.

When the computing device 105 determines that the grill shutter 200 is not in the specified position, the computing device 105 can send a notification indicating that the active grill shutter 200 is malfunctioning. For example, the computing device 105a of the host vehicle 101a can send a notification to the computing device 105b of the target vehicle 101b indicating that the active grill shutter 200 is malfunctioning. The computing device 105a can instruct the computing device 105b to determine whether occupants are present in the target vehicle 101b. The computing device 105b can determine whether there are occupants in the cabin using, e.g., seat weight sensors, cameras, etc. If the computing device 105b determines that there are no occupants present in the target vehicle 101b, the computing device 105a can instruct the computing device 105b to actuate a climate control subsystem 120. For example, if the specified position is the open position, and the active grill shutter 200 is not in the open position, the propulsion 120 of the target vehicle 101b may increase in temperature, requiring additional cooling. Thus, the computing device 105a can actuate the climate control subsystem 120 in the target vehicle 101b to increase heating of the target vehicle 101b cabin, decreasing the temperature of the propulsion 120 of the target vehicle 101b.

Figure 4:
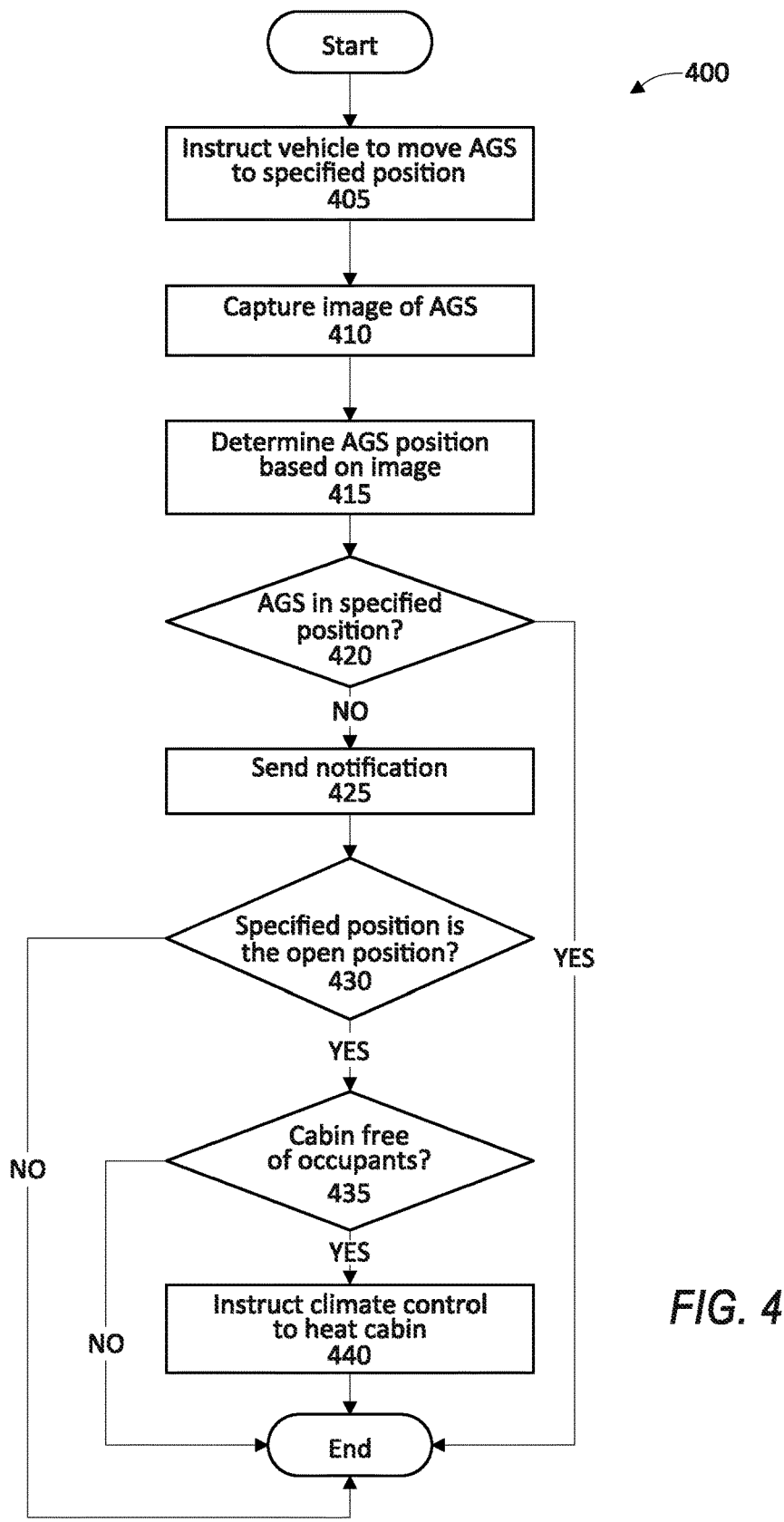
FIG. 4 is a block diagram of an example process for operating the active grill shutter.

FIG. 4 illustrates an example process 400 for determining whether an active grill shutter 200 is functional. The process 400 begins in a block 405, in which a host vehicle 101a instructs a target vehicle 101b to move the active grill shutter 200 to a specified position. The specified position can be the open position, as shown in FIG. 3A, or the closed position, as shown in FIG. 3B. The computing device 105b of the target vehicle 101b instructs the motor of the active grill shutter 200 to move the panels 210 to the specified position.

Next, in a block 410, the computing device 105a of the host vehicle 101a actuates a camera 110 to capture an image of the active grill shutter 200. The image can be an infrared image and/or an optical image. As shown in FIGS. 2A and 2B, the camera 110 can be a rearview camera 110 or a front camera 110 based on where the host vehicle 101a is located relative to the target vehicle 101b.

Next, in a block 415, the computing device 105a of the host vehicle 101a determines the position of the panels 210 of the active grill shutter 200 based on the image. As described above, if the image is an infrared image, the computing device 105a can compare the temperature of the grill shutter 200, as determined by the infrared image, to an ambient air temperature. If the image is an optical image, the computing device 105a can apply image subtraction techniques to produce a difference image, as discussed above, between the optical image and a stored image of the grill shutter in the specified position of the block 405.

Next, in a block 420, the computing device 105a of the host vehicle 101a determines whether the position of the active grill shutter 200 is the specified position. For example, if the computing device 105a determines that the active grill shutter 200 is in the closed position and the specified position is the open position, the computing device 105a can determine that the active grill shutter 200 is not in the specified position. If the active grill shutter 200 is in the specified position, the active grill shutter 200 is properly operating, i.e., the active grill shutter 200 is in the specified position and will move to a different position when instructed by the computing device 105b. Following the block 420 when the active grill shutter 200 is in the specified position, the process 400 ends. Otherwise, the process 400 continues in a block 425.

In the block 425, the computing device 105a of the host vehicle 101a sends a notification to the computing device 105b of the target vehicle 101b indicating that the active grill shutter 200 is not in the specified position. Because the active grill shutter 200 is not in the specified position, the active grill shutter 200 may be malfunctioning. Alternatively or additionally, the grill shutter sensor 110 may be malfunctioning if the grill shutter sensor 110 indicates that the grill shutter 200 is in the specified position when the computing device 105a determines otherwise. The notification can include an indication that the grill shutter 200 and/or the grill shutter sensor 110 is malfunctioning.

Next, in a block 430, the computing device 105a of the host vehicle 101a determines whether the specified position of the grill shutter 200 is the open position. If the specified position is the open position, then the active grill shutter 200 is not in the open position, which can result in an increased temperature of the propulsion 120 of the target vehicle 101b. If the specified position is the open position, the process continues 400 in a block 435. Otherwise, the process 400 ends.

In the block 435, the computing device 105a instructs the computing device 105b to determine whether the cabin of the target vehicle 101b is free of occupants. To increase cooling of the propulsion 120 of the target vehicle 101b, the computing device 105b can actuate a climate control subsystem 120 to heat the cabin of the target vehicle 101b. However, the computing device 105b should only heat the cabin when there are no occupants present. The computing device 105b can determine whether there are occupants in the cabin using, e.g., seat weight sensors, cameras, etc. If the computing device 105b determines that the cabin is free of occupants, the process 400 continues in a block 440. Otherwise, the process 400 ends.

In the block 440, the computing device 105a of the host vehicle 101a instructs the computing device 105b of the target vehicle 101b to actuate a climate control subsystem 120 to heat the cabin of the target vehicle 101b. Because the active grill shutter 200 is not in the open position, the propulsion 120 can require additional cooling. Heating the cabin of the target vehicle 101b with the climate control subsystem 120 can reduce the temperature of the propulsion 120. Following the block 440, the process 400 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer programmed to:
 from a first vehicle, instruct a second vehicle to move a grill shutter to a specified position;
 capture an image of the grill shutter;
 determine whether the grill shutter is in the specified position based at least in part on the image; and
 message the second vehicle indicating a malfunction when the grill shutter is not in the specified position.

2. The system of claim 1, wherein the specified position is an open ion.

3. The system of claim 2, wherein the computer is further programmed to determine a temperature of the grill shutter based at least in part on the image, and to message the second vehicle indicating the malfunction when the temperature of the grill shutter is within a predetermined threshold of an ambient air temperature.

4. The system of claim 3, wherein the computer is further programmed to instruct the second vehicle to determine whether occupants are present in the second vehicle and to actuate a climate control subsystem when no occupants are present in the second vehicle.

5. The system of claim 1, wherein the specified position is a closed position.

6. The system of claim 5, wherein the computer is further programmed to determine a temperature of the grill shutter based at least in part on the image, and to message the second vehicle indicating the malfunction when the temperature of the grill shutter is above a predetermined threshold of an ambient air temperature.

7. The system of claim 1, wherein the computer is further programmed to compare the image of the grill shutter to a stored image of another grill shutter in the specified position and to determine whether the grill shutter is in the specified position.

8. The system of claim 1, wherein the computer is further programmed to capture the image with a rearview camera.

9. The system of claim 1, wherein the computer is further programmed to instruct a grill shutter sensor of the second vehicle to determine whether the grill shutter is in the specified position, and to message the second vehicle indicating a malfunction in the grill shutter sensor when the determination by the grill shutter sensor differs from the determination based on the image.

10. A method, comprising:
from a first vehicle, instructing a second vehicle to move a grill shutter to a specified position;
capturing an image of the grill shutter;
determining whether the grill shutter is in the specified position based at least in part on the image; and
messaging the second vehicle indicating a malfunction when the grill shutter is not in the specified position.

11. The method of claim 10, wherein the specified position is an open position.

12. The method of claim 11, further comprising determining a temperature of the grill shutter based at least in part on the image, and messaging the second vehicle indicating the malfunction when the temperature of the grill shutter is within a predetermined threshold of an ambient air temperature.

13. The method of claim 12, further comprising instructing the second vehicle to determine whether occupants are present in the second vehicle and actuating a climate control subsystem when no occupants are present in the second vehicle.

14. The method of claim 10, wherein the specified position is a closed position.

15. The method of claim 14, further comprising determining a temperature of the grill shutter based at least in part on the image, and messaging the second vehicle indicating the malfunction when the temperature of the grill shutter is above a predetermined threshold of an ambient air temperature.

16. The method of claim 10, further comprising comparing the image of the grill shutter to a stored image of another grill shutter in the specified position and determining whether the grill shutter is in the specified position.

17. The method of claim 10, further comprising instructing a grill shutter sensor to determine whether the grill shutter is in the specified position, and messaging the second vehicle indicating a malfunction in the grill shutter sensor when the determination by the grill shutter sensor differs from the determination based on the image.

18. A system, comprising a computer having a processor and a memory, the memory storing instructions executable by the processor to:

receive instructions from a first vehicle to move an active grill shutter of a second vehicle to a specified position;

move the active grill shutter to the specified position; and receive a message indicating whether the active grill shutter is malfunctioning;

identify a repair location; and actuate one or more vehicle subsystems to move the second vehicle to the repair location.

\* \* \* \* \*

UNITED STATES PATENT AND TRADEMARK OFFICE
CERTIFICATE OF CORRECTION

PATENT NO.       : 10,011,165 B2
APPLICATION NO.  : 15/367314
DATED            : July 3, 2018
INVENTOR(S)      : Aed M. Dudar Page 1 of 1

It is certified that error appears in the above-identified patent and that said Letters Patent is hereby corrected as shown below:

In the Claims

Column 8, in Line 56, replace "is an open ion" with -- "is an open position" --.

Signed and Sealed this
Twenty-eighth Day of May, 2019

Andrei Iancu
*Director of the United States Patent and Trademark Office*